United States Patent [19] [11] 3,870,020
Hunt [45] Mar. 11, 1975

[54] SYSTEM FOR GROWING SHELLFISH
[75] Inventor: George R. Hunt, Mahtomedi Village, Minn.
[73] Assignee: Minnesota Mining and Manufacturing Company, St. Paul, Minn.
[22] Filed: Aug. 2, 1973
[21] Appl. No.: 384,933

Related U.S. Application Data
[63] Continuation-in-part of Ser. No. 203,155, Nov. 30, 1971, abandoned.

[52] U.S. Cl. .................................................. 119/4
[51] Int. Cl. .......................................... A01k 61/00
[58] Field of Search .......................... 119/2–4, 51.11

[56] References Cited
UNITED STATES PATENTS
3,050,029   5/1962   Appleton ..................... 119/51.11 X
3,517,648   6/1970   Budge ....................................... 119/4

Primary Examiner—Louis G. Mancene
Assistant Examiner—J. N. Eskovitz
Attorney, Agent, or Firm—Alexander, Sell, Steldt & DeLaHunt

[57]   ABSTRACT

A system for growing shellfish to maturity in minimum time wherein the nutrient material is introduced at a rate determined in part by the size of the animal.

4 Claims, No Drawings

SYSTEM FOR GROWING SHELLFISH

This application is a continuation-in-part of my co-pending application Ser. No. 203,155 filed Nov. 30, 1971 and now abandoned.

This invention relates to the growing of shellfish from the juvenile stage to merchandizable maturity. While not limited thereto, the invention affords particular advantages in the growing of immobile shellfish such as oysters and will therefore be described with particular reference thereto.

Oyster larvae or spat at an early stage in their development attach themselves to a supportive cultch where they remain during further growth. Lobsters, on the other hand, are free swimming and for controlled growing must therefore be confined by means of screens or other barriers.

Under natural conditions the oyster remains within a sea-water environment which is subject to major variations in temperature, salinity, and concentration of nutrients as well as being a source of destructive influences including predators, silt, and chemical pollutants or poisons. A more accommodating environment may be artificially created and maintained using either natural or reconstituted sea-water, either by purification of natural sea-water or by salination and other treatment of fresh water.

Growth of oysters is known to be inhibited at temperatures lower than about 5°C. At a temperature of about 26°-27°C spawning occurs. See, for example, the book "Physiology of Mollusca", by K. M. Wilbur and G. Owen, Academic Press, 1966, Vol. 1, particularly page 234. Intermediate temperatures within the range of 18°-25°C, particularly at about 23°C, are found to provide optimum growth conditions. Temperature in the growing chambers may be readily controlled for example, by suitable heating and cooling means within the chamber or by introduction of preheated or precooled water in appropriate amounts from external heating or cooling chambers.

Salinity of the natural environment may vary from about 15 up to at least about 35 parts per thousand. In the controlled environment of the system herein described, it is found desirable to maintain the salinity at between 29 and 33 parts per thousand, and preferably very close to 31 parts, as measured with a salinometer. The desired concentration is maintained by appropriate additions of sea salt or fresh water, or of sea water.

Input or makeup waters must be purified to remove harmful foreign matter. Purification is accomplished by filtration and by irradiation with ultraviolet. Filters should remove particulates down to no larger than 1 micron; exposure to ultraviolet should be sufficient to destroy all sources of infection. Filters and purifiers as used in swimming pool maintenance are well adapted for such purposes. To maintain the purity of the growth environment it is desirable to recirculate or replace the entire volume through the filtration and irradiation stations once each 24 hours. Such practice not only permits the maintenance of cleanliness in the growth tank but is also of advantage in maintaining desired temperature and salinity levels. Purging is most efficiently accomplished just prior to feeding, in order that the least possible amount of foodstuff be lost.

Aeration of the growth environment provides oxygen for the oysters and serves as a simple and efficient means for maintaining uniform concentration of foodstuff. A preferred system employs an air sparger located at a lower corner of the growing tank.

It might be expected that an absence of sufficient food would retard the growth of the oysters. Surprisingly, it has now been found that an overabundance has a similar retarding effect. At relatively high concentrations of food the oysters are found to cease feeding, and if the condition is maintained the animals soon die.

The natural diatom *Cyclotella nana* is a preferred food source for oysters and may be obtained by cultivation under controlled conditions as described in U.S. Pat. No. 3,736,824. The organism is introduced in the form of a relatively highly concentrated feedstock, e.g., at a concentration of $10^6$ to $10^7$ cells per ml. as may be determined by microscopic counting techniques. Concentration within the growth area is determined at intervals as may be required for control purposes. The liquid feedstock is rapidly dispersed throughout the growth tank by the mixing and circulating action of the aerator.

Other food sources may be substituted for the *C. nana*. Algae such as *Scenedesmus* and *Actin* are examples of other naturally occurring or cultivated species which have been found useful but, like the *C. nana*, are subject to poisoning or other deleterious influences. Artificially prepared foodstuffs formulated to substantially the same nutritional balance, i.e., an equivalent protein nitrogen content, and supplied in very small particle size, offer a particularly useful source of oyster food for the purposes of this invention. Such a material should contain 25-40% protein, 6-10% carbohydrate, and 1-10% fat (lipid). A specific example is "Tetramin" fish food, supplied in dry flake or powder form and introduced into the growth tank either as an impalpable dry powder or dispersed in water.

In order to maintain the optimum concentration of foodstuff both efficiently and economically it is necessary both to limit the concentration of oysters within the growth environment and to follow the increase in size of the oysters. Oyster density may be within the range of two to ten oysters per gallon; four is a preferred number when feeding natural foods, with somewhat greater numbers being preferred when feeding the more concentrated formulated foods. Distribution of the oysters within the growth tank should for best results be as uniform as possible. Measurements of representative samplings of the oysters at weekly intervals is ordinarily entirely adequate for maintaining the food concentration at optimum level.

Using *C. nana* as the source of food, it has now been found that maximum growth rate may be achieved by holding the maximum concentration to not more than $5 \times 10^5$ or preferably $1 \times 10^5$ cells per ml. while supplying a total per day in accordance with the equation $$C = Ah^2$$

where $C$ is the total number of cells per day per oyster, $A$ is a constant within the range of $0.3 \times 10^6$ to $1.25 \times 10^6$, and $h$ is the average height of the oysters in millimeters. Other nutritionally equivalent sources of food may be used as hereinbefore indicated provided the turbidity of the growth environment is never greater than that produced by the *C. nana* at the maximum permitted concentration.

It may easily be shown that for a given size of growing tank and with immature oysters of small size, the food supply for an entire day may be added at one time while remaining well within the limits of maximum concentration. As the size of the oysters and the total daily food requirement increases, the addition of the entire daily amount at one time results in an excessive concentration which may be well above the preferred upper value of $1 \times 10^5$ cells or the limiting value of $5 \times 10^5$ cells per ml. Continuous slow addition of foodstock at the higher levels on the other hand results in a loss of food values due to continual overflow of undepleted liquid. It has been found that most efficient as well as most rapid growth of oysters is achieved by dividing the total daily food supply uniformly into the minimum number of equally spaced feedings consistent with the requirements of maximum concentration. Where less efficient utilization of foodstuff may be tolerated, more frequent feedings are acceptable; but even here, best results are attained when additional foodstuffs as well as makeup or control waters are added only after feeding has substantially reduced the concentration of food in the growth environment.

Normal rate of growth for oysters under natural growing conditions in temperate climates carries the animals from the juvenile or spat stage to merchandizable maturity in approximately 250 weeks. Using the principles stated hereinbefore, it has been found possible to reduce this period to approximately 50 weeks.

A specific example will serve further to illustrate the principles involved. In this example, 20-gallon tanks serve as the growth chambers. Immature oysters previously allowed to set on shell cultch are thinned to a total of four or five per shell and at approximately equal size, thereby allowing a distance of at least about three inches between adjacent oysters. The shells are suspended in the tank in as uniform a distribution as possible, to totals of 20 and 80 oysters for the 20 gallons of volume. The tanks are filled with filtered and purified sea water maintained at a temperature of 19° ± 1°C. and a salinity of 31 parts per thousand. Air is continuously pumped into the tanks through ceramic spargers located in one lower corner and creates a gentle circulation of the tank contents. *Cyclotella nana*, supplied at a concentration of $10^7$ cells per ml., is used as the foodstock. Height of each oyster is measured at weekly intervals and the daily food ration calculated on the average height is maintained during the ensuring week. Calculations are made using the maximum feeding coefficient $A = 1.25 \times 10^6$. The following tabulation shows the growth rate achieved.

Table 1

| Time in Weeks | Average Height in mm. Population Density | |
|---|---|---|
| | one/gallon | four/gallon |
| 0 | 36 | 30 |
| 2 | 41 | 34 |
| 4 | 44 | 38 |
| 6 | 48 | 42 |
| 10 | 52 | 48 |
| 14 | 60 | 53 |
| 18 | 64 | 56 |

Calculations for low density tank:

At the start, oysters at 36 mm. will require $36 \times 36 \times 1.25 \times 10^6 = 1.6 \times 10^9$ cells/oyster/day at one oyster per gallon $= (1.6 \times 10^9)/3800 = 4.3 \times 10^5$ cells/ml., which is less than the maximum permitted concentration of $5 \times 10^5$ cells/ml., hence the entire daily ration may be added at one time.

After two weeks, the daily requirement is
$41 \times 41 \times 1.25 \times 10^6 = 2.1 \times 10^9$ cells/oyster/day
which in a single feeding would produce a concentration of $5.5 \times 10^5$ cells/ml., hence the ration should be added in two equally spaced halves. At eighteen weeks, if further growth be desired, the corresponding values are $5.1 \times 10^9$ cells/oyster/day, concentration of $1.3 \times 10^6$ cells/ml., and feeding in three equally spaced thirds, i.e., $1.7 \times 10^9$ cells/oyster, or a total of 3400 ml. of the *C. nana* culture each eight hours.

Although the calculations may be carried out as above shown and the addition of foodstock in indicated amounts and at indicated intervals be accomplished by hand operation, it will be apparent that mechanical calculating and dispensing means serving the same functions may be employed once the requirements have been established and a source of foodstock at constant concentration is provided. Thus, the container for the foostuff may be connected to the growth tank by a valve system operated by a timing mechanism for admitting predetermined quantities of the material at predetermined intervals, the timing mechanism being preset at weekly intervals to meet the requirements determined as above on the basis of measurements of average height. Automatic control of temperature, salinity, purification and purge operations may likewise be readily accomplished by known means in compliance with the requirements indicated hereinbefore.

What is claimed is as follows:

1. A method for growing oysters to merchandizable maturity comprising supporting immature oysters on cultch in an aquatic growth medium at a concentration of from two to ten oysters per gallon, maintaining said medium at a temperature of 18°–25°C. and a salinity of 15-35 parts per thousand, supplying to said oysters a foodstock nutritionally-equivalent to *C. nana*, and regulating the rate of supply of said foodstock to avoid a concentration or turbidity greater than that of $5 \times 10^5$ cells of *C. nana* per ml. while providing a daily ration as expressed by the equation $$C = Ah^2$$

wherein $C$ = no. of cells of *C. nana* per oyster per day, $A$ = a feeding constant between $0.3 \times 10^6$ and $1.25 \times 10^6$, and $h$ = average height of the oysters in mm.

2. Method of claim 1 wherein the rate of supply of said foodstuff is regulated to avoid a concentration or turbidity greater than that of $1 \times 10^5$ cells of *C. nana* per ml.

3. Method of claim 1 wherein the periods between addition of foodstock are uniform and of maximum duration.

4. Method of claim 1 wherein the foodstock is *C. nana* in aqueous medium and at concentration of $10^6$ to $10^7$ cells/ml.

* * * * *

UNITED STATES PATENT OFFICE
CERTIFICATE OF CORRECTION

PATENT NO. : 3,870,020
DATED : March 11, 1975
INVENTOR(S) : GEORGE R. HUNT

It is certified that error appears in the above-identified patent and that said Letters Patent are hereby corrected as shown below:

Column 2, line 12: "Pat. No. 3,736,824" should read-

-- Patent No. 3,763,824 --

Signed and sealed this 13th day of May 1975.

(SEAL)
Attest:

RUTH C. MASON
Attesting Officer

C. MARSHALL DANN
Commissioner of Patents
and Trademarks